(12) United States Patent
Smith et al.

(10) Patent No.: US 6,476,829 B1
(45) Date of Patent: Nov. 5, 2002

(54) METHOD AND APPARATUS FOR ZOOMING ON NON-POSITIONAL DISPLAY ATTRIBUTES

(75) Inventors: Randall B. Smith, Palo Alto; Helen A. Cunningham, Los Altos Hills, both of CA (US)

(73) Assignee: Sun Microsystems, Inc., Santa Clara, CA (US)

(*) Notice: Subject to any disclaimer, the term of this patent is extended or adjusted under 35 U.S.C. 154(b) by 199 days.

(21) Appl. No.: 09/596,204

(22) Filed: Jun. 15, 2000

(51) Int. Cl.[7] .............................. G06F 3/14; G06F 3/033
(52) U.S. Cl. ...................... 345/764; 345/440; 345/771; 345/581
(58) Field of Search ................................ 345/764, 440, 345/771–773, 835, 767, 784, 581, 589, 593

(56) References Cited

U.S. PATENT DOCUMENTS

| | | | |
|---|---|---|---|
| 5,043,920 A | | 8/1991 | Malm et al. ................. 364/521 |
| 5,333,244 A | * | 7/1994 | Harashima ............... 345/440 X |
| 5,448,693 A | * | 9/1995 | Blades et al. ................ 345/835 |
| 5,850,531 A | | 12/1998 | Cox et al. .................... 345/349 |
| 5,987,470 A | | 11/1999 | Meyers et al. ............... 707/102 |
| 6,144,379 A | * | 11/2000 | Bertram et al. .............. 345/835 |
| 6,222,547 B1 | * | 4/2001 | Schwuttke et al. ...... 345/440 X |
| 6,330,008 B1 | * | 12/2001 | Razdow et al. .............. 345/772 |
| 6,337,699 B1 | * | 1/2002 | Nielsen ................... 345/772 X |

OTHER PUBLICATIONS

IBM Technical Disclosure Bulletin entitled "Min–Max Slider," XP 000124251 vol. 33, No. 3B, Aug. 1990, pp. 31–32.

* cited by examiner

Primary Examiner—Raymond J. Bayerl
(74) Attorney, Agent, or Firm—Park, Vaughan & Fleming LLP

(57) ABSTRACT

One embodiment of the present invention provides a system for viewing plurality of objects on a display that allows a user to zoom on a non-positional display attribute of the plurality of objects. The system operates by receiving a value for a mapped attribute for an object as well as a value for a zooming parameter for the non-positional display attribute. The system maps the mapped attribute to the non-positional display attribute for the object by computing a function of the value of the mapped attribute and the zooming parameter to produce a value for the non-positional display attribute. If the value for the zooming parameter changes in a first direction, the function maps a narrower range of mapped attribute values to prominent display attribute values. If the value for the zooming parameter changes in a second direction, the function maps a wider range of mapped attribute values to prominent display attribute values. Next, the system outputs the object to the display using the non-positional display attribute. In one embodiment of the present invention, the value for the zooming parameter is received from the user through a data input device, so that the user can adjust the zooming parameter. This allows the user to narrow or widen a range of mapped attributes that are displayed with prominent display attribute values.

21 Claims, 5 Drawing Sheets

METHOD AND APPARATUS FOR ZOOMING ON NON-POSITIONAL DISPLAY ATTRIBUTES

RELATED APPLICATION

The subject matter of this application is related to the subject matter U.S. patent application Ser. No. 09/303,056, filed Apr. 30, 1999, pending.

BACKGROUND

1. Field of the Invention

The present invention relates to user interfaces for computer systems. More particularly, the present invention relates to a method and an apparatus for viewing a collection of objects on a display that allows a user to "zoom" on non-positional display attributes of the objects.

2. Related Art

In analyzing a large set of multi-dimensional data, it is often useful to output the data to a graphical display so that the data can be more easily visualized. More information can be conveyed in the graphical display if certain parameters of the data are represented by non-positional display attributes, such as color or size.

For example, in order to represent a set of data wherein each data point has four different dimensions, the first dimension and the second dimension of a data point can be represented by a horizontal and a vertical location of the data point on a display. The third dimension can be represented by the color of the data point on the display. Finally, the fourth dimension can be represented by the size of the data point on the display. In this way, four different dimensions can be represented for each data point on a two-dimensional display.

In using a non-positional display attribute, such as brightness, to display a data value, it is advantageous to provide a wide range of brightness values to represent a corresponding range of data values. For example, rather than representing a data point using only a single brightness value, the brightness of the data point can be varied from dim to bright through intermediate brightness values (eg, 10%, 50%, 90%) in order to represent a wide range of possible data values.

In some cases, it is useful to be able to selectively amplify or highlight subtle differences in non-positional display attributes in order to more carefully examine a specific range of corresponding data values. This is analogous to spatial zooming in which a user can "zoom" into a particular spatial region of a graphical display in order to more carefully examine minute differences in the spatial arrangement of displayed objects, except that the minute differences are represented through non-positional display attributes rather than through a spatial location.

What is needed is a method and an apparatus that allows a user to zoom on non-positional display attributes.

SUMMARY

One embodiment of the present invention provides a system for viewing plurality of objects on a display that allows a user to zoom on a non-positional display attribute of the plurality of objects. The system operates by receiving a value for a mapped attribute for an object as well as a value for a zooming parameter for the non-positional display attribute. The system maps the mapped attribute to the non-positional display attribute for the object by computing a function of the value of the mapped attribute and the zooming parameter to produce a value for the non-positional display attribute. If the value for the zooming parameter changes in a first direction, the function maps a narrower range of mapped attribute values to prominent display attribute values. If the value for the zooming parameter changes in a second direction, the function maps a wider range of mapped attribute values to prominent display attribute values. Next, the system outputs the object to the display using the non-positional display attribute.

In one embodiment of the present invention, the value for the zooming parameter is received from the user through a data input device, so that the user can adjust the zooming parameter. This allows the user to narrow or widen a range of mapped attributes that are displayed with prominent display attribute values.

In one embodiment of the present invention, the non-positional display attribute can include, a fadedness of the object against a background, a transparency of the object, a size of the object on the display, a color of the object, a blink rate of the object, a jiggle rate of the object, a drawing order of the object relative to other objects, a line thickness of the object, a contrast of the object, a spatial frequency of a pattern for the object, a halo parameter for the object, an animation rate for the object, an offset of a drop shadow for the object, a response sensitivity to user input of the object, a binocular depth of an object and a loudness of an object (if the object has an associated sound).

In one embodiment of the present invention, the non-positional display attribute is fadedness. In this embodiment, a display attribute value that results in the object being more faded in the display is less prominent. Conversely, a display attribute value that results in the object being less faded in the display is more prominent. Note that the term "prominence" is a measure of how noticeable an object is on the display relative to other objects. For example, objects that appear brighter or larger are generally more prominent that objects that appear dimmer or smaller.

In one embodiment of the present invention, the non-positional display attribute has more than two possible values.

One embodiment of the present invention additionally allows the user to scroll on the non-positional display attribute of the object. This embodiment operates by using a difference between the value of the mapped attribute for the object and a scrolling reference value received from the user in computing the function to produce non-positional display attribute for the object. In this way, as the user changes the scrolling reference value, different ranges of mapped attribute values are mapped to prominent display attribute values.

In one embodiment of the present invention, the steps of, receiving the value for the mapped attribute, mapping the mapped attribute, and displaying the object are repeated for the plurality of objects.

In one embodiment of the present invention, the value of the non-positional display attribute for the object attains has a high prominence value for intermediate display attribute values. As the value of the mapped attribute grows larger than the intermediate display attribute values, the prominence of the non-positional display attribute decreases. Similarly, as the value of the mapped attribute becomes smaller than the intermediate display attribute values, the prominence of the non-positional display attribute decreases.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Computer System

Figure 1:
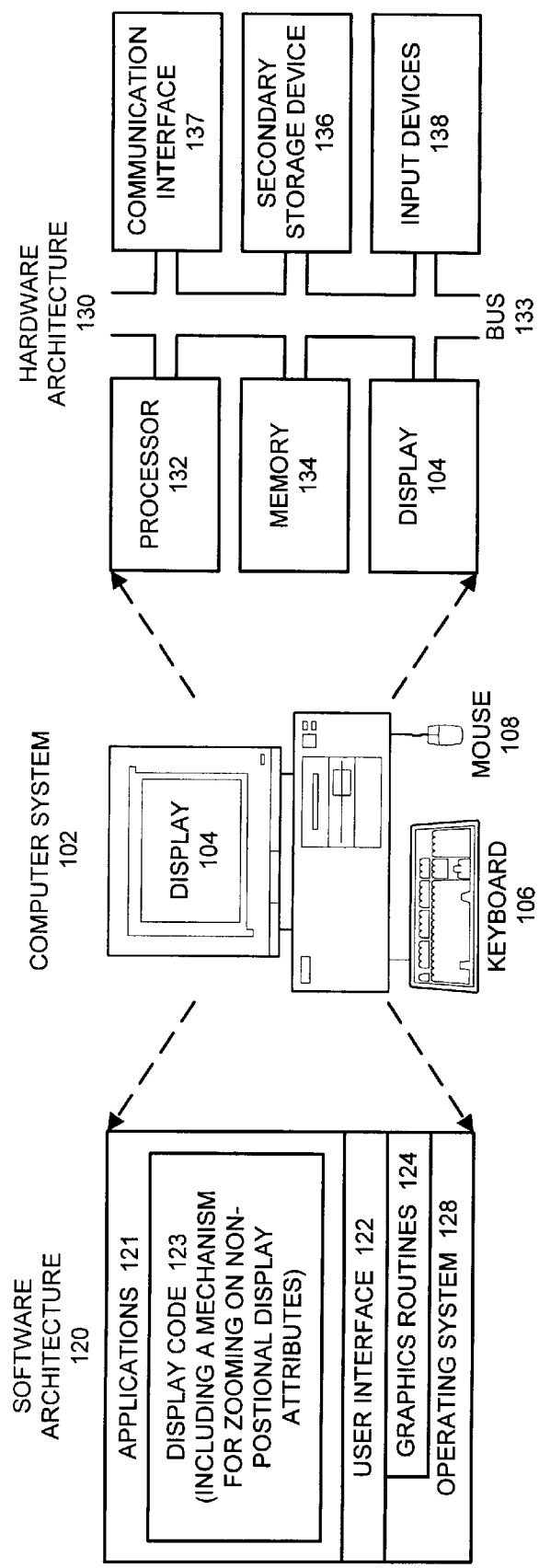
FIG. 1 illustrates a computer system in accordance with an embodiment of the present invention.

FIG. 1 illustrates computer system 102 in accordance with an embodiment of the present invention. Computer system 102 may include any type of computing device with a display 104, including a personal computer, a workstation or a mainframe computer system. Computer system 102 may additionally include portable computing devices, such as a personal organizer, a two-way pager, a cellular telephone or a mobile web browser.

Computer system 102 also includes a number of input devices, including keyboard 106 and mouse 108, for receiving input from the user. Note that many other types of input devices can be used with the present invention, including input buttons on a personal organizer or a touch sensitive display. Display 104 may include any type of display device on computer system 102, including but not limited to, a cathode ray tube, a flat panel display, a LCD display or an active matrix display.

Computer system 102 includes software architecture 120. At the lowest level, software architecture 120 includes operating system 128, which supports the execution of applications on computer system 102. In one embodiment of the present invention, operating system 128 includes the SOLARIS™ operating environment distributed by SUN Microsystems, Inc. of Palo Alto, Calif. In another embodiment, operating system 128 includes the Palm OS that is contained within the Palm connected organizer, distributed by the 3COM corporation of Sunnyvale, Calif.

Alongside operating system 128 is graphics routines 124. Graphics routines 124 include any routines for facilitating the generation of images on display 104.

User interface 122 resides on top of operating system 128 and graphics routines 124. User interface 122 interacts with operating system 128 and graphics routines 124 to generate an output for display 104 in accordance with an embodiment of the present invention.

Applications 121 reside on top of user interface 122. Applications 121 can include any type of applications that can run on computer system 102.

Applications 121 include display code 123 which facilitates displaying a set of multi-dimensional data. Display code 123 includes a mechanism that facilitates zooming on non-spatial display attributes in accordance with an embodiment of the present invention. This mechanism is described in more detail below with reference to FIGS. 2 through 7B.

Computer system 102 also includes hardware architecture 130. Hardware architecture 130 includes processor 132, memory 134, display 104, secondary storage device 136, input devices 138 and communication interface 137. These components are coupled together by bus 133. Processor 132 may include any type of computational engine for executing programs within computer system 102. This includes, but is not limited to, a microprocessor, a device controller, and a computational device within an appliance. Memory 134 may include any type of random access memory for storing code and data for use by processor 132. Secondary storage device 136 may include any type of non-volatile storage device for storing code and data to for use by processor 132. This includes, but is not limited to, magnetic storage devices, such as a disk drive, and electronic storage devices, such as flash memory or battery backed up RAM. Display 104 (described above) may include any type of device for displaying images on computer system 102. Input devices 138 may include any type of devices for inputting data into computer system 102. This includes keyboard 106 and mouse 108 as well as input buttons or a touch-sensitive display. Communication interface 137 may include any type of mechanism for communicating between computer system 102 and an external host. This may include a linkage to a computer network through electrical, infrared or radio signal communication pathways.

Mapping of Data Objects the Display Objects

Figure 2:
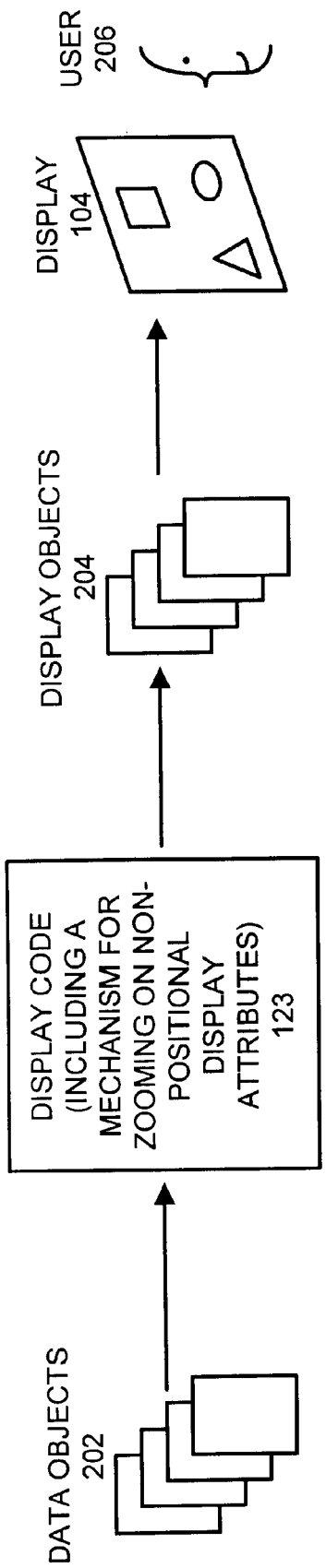
FIG. 2 illustrates how data objects are mapped to display objects in accordance with an embodiment of the present invention.

FIG. 2 illustrates how data objects 202 are mapped to display objects 204 in accordance with an embodiment of the present invention. A set of multidimensional data is received in the form of a plurality of data objects 202. These data objects 202 are processed within display code 123. Note that display code 123 includes a mechanism for zooming on non-spatial display attributes.

Display code 123 produces a plurality of display objects 204 corresponding to the data objects 202. These display objects 204 are outputted to display 104 to be viewed by a user 206.

Process of Creating and Displaying Display Objects

Figure 3:
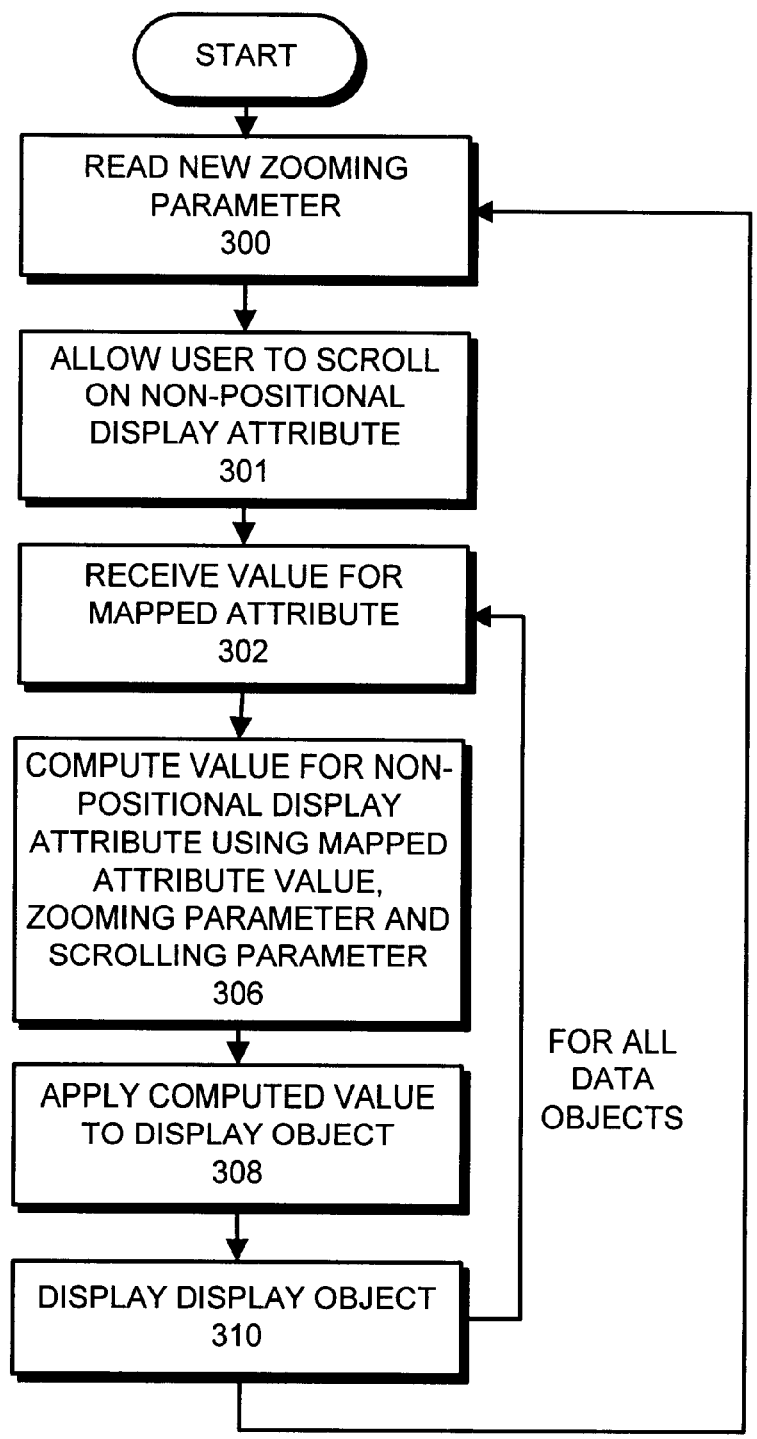
FIG. 3 is a flow chart illustrating the process of creating and displaying display objects in accordance with an embodiment of the present invention.

FIG. 3 is a flow chart illustrating the process of creating and displaying display objects in accordance with an embodiment of the present invention. The system starts by reading a new zooming parameter (step 300). This new zooming parameter can be received from an input device, such as a mouse or a slider bar from user 206. Alternatively, the new zooming parameter can originate from a source other than from user 206.

The system may also allow user 206 to "scroll" on the non-positional display attribute (step 301). This scrolling can be accomplished by using a difference between the value of the mapped attribute for the object and a scrolling reference value received from user 206 in computing the function to produce the non-positional display attribute for the object. In this way, as user 206 changes the scrolling reference value, different ranges of mapped attribute values are mapped to prominent display attribute values.

Next, the system receives a value for a mapped attribute of a data object (step 302). This value can be received from a data file within computer system 102, or alternatively from an external source, such as from a remote file server or through manual input. Display code 123 then computes a value for a non-positional display attribute using the value for the mapped attribute, the scrolling parameter and the zooming parameter (step 306). Next, the system applies the computed value to an associated display object (step 308). Finally, the system displays the display object to display 104 (step 310). The system repeats the preceding steps for all data objects.

Next, the system returns to step 300 to redisplay data objects 202 with the new zooming parameter and/or scrolling reference value.

Note that the present invention can generally operate using any non-positional display attribute. For example, the following non-positional display attributes can be used: a fadedness of the object against a background, a transparency of the object, a size of the object on the display, a color of the object, a blink rate of the object, a jiggle rate of the object, a drawing order of the object relative to other objects, a line thickness of the object, a contrast of the object, a spatial frequency of a pattern for on the object, a halo intensity for the object, a halo size for the object, an animation rate for the object, an offset of a drop shadow for the object, a response sensitivity to user input of the object, a binocular depth of an object, a loudness of an object (if the object has an associated sound) or any other display attribute which can perceivably vary in intensity.

Functions for Computing Display Attributes

Figure 4:
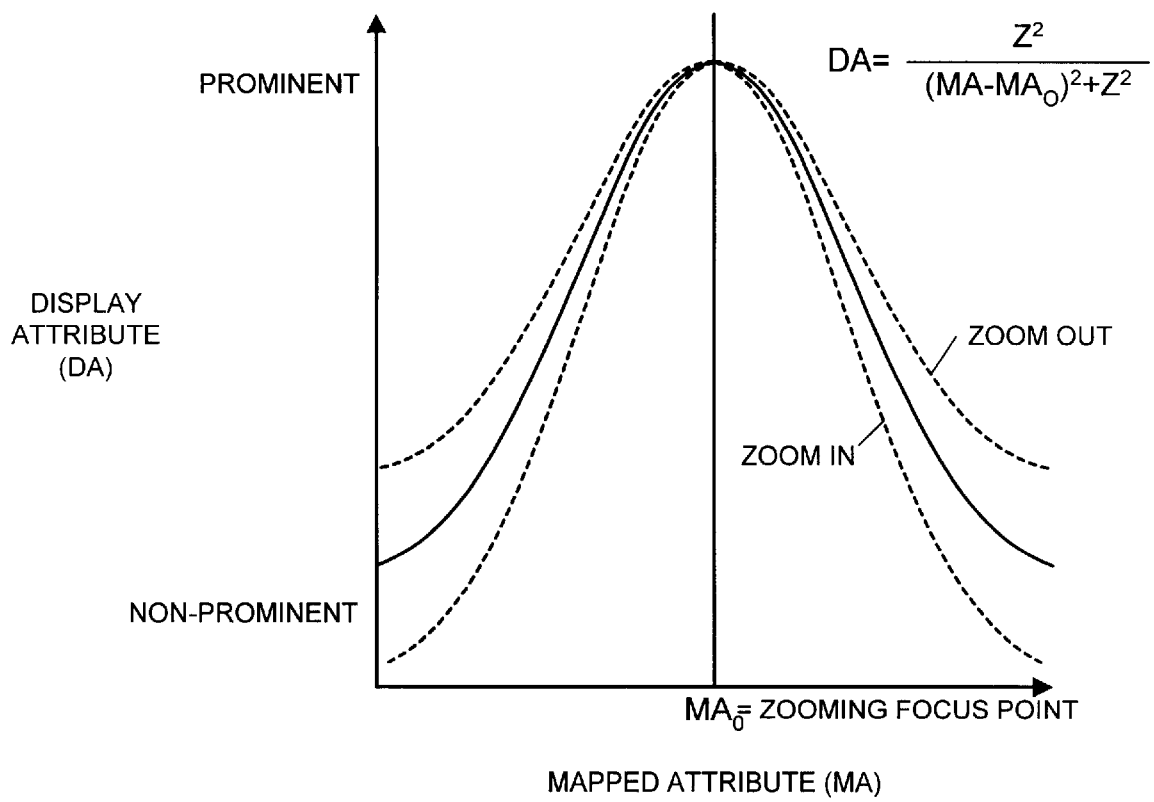
FIG. 4 illustrates one possible function for computing a display attribute in accordance with an embodiment of the present invention.

FIG. 4 illustrates one possible function for computing a display attribute in accordance with an embodiment of the present invention. This function computes a display attribute DA as a function of a zooming parameter, Z, and a mapped attribute MA. More specifically, $DA=Z^2/((MA-MA_0)^2+Z^2)$. Note that DA reaches a maximum value when MA equals the value $MA_0$. The value DA falls off on either side of $MA_0$ (the zooming focus point).

If the zooming parameter Z is increased, the function falls off more slowly from $MA_0$. This means a wider range of mapped attribute values around $MA_0$ are mapped to prominent display attributes values (this is referred to as zooming out). If the zooming parameter Z is decreased, the function falls off more rapidly from $MA_0$. This means a narrower range of mapped attribute values around $MA_0$ are mapped to prominent display attributes values (this is referred to as zooming in).

Hence, by adjusting zooming parameter, Z, user 206 can choose to focus on a wider or narrower range of data values around $MA_0$. Furthermore, if the mapped attribute MA is the difference between an input value and a scrolling parameter, the scrolling parameter can be adjusted to align $MA_0$ with different ranges of input values.

Figure 5:
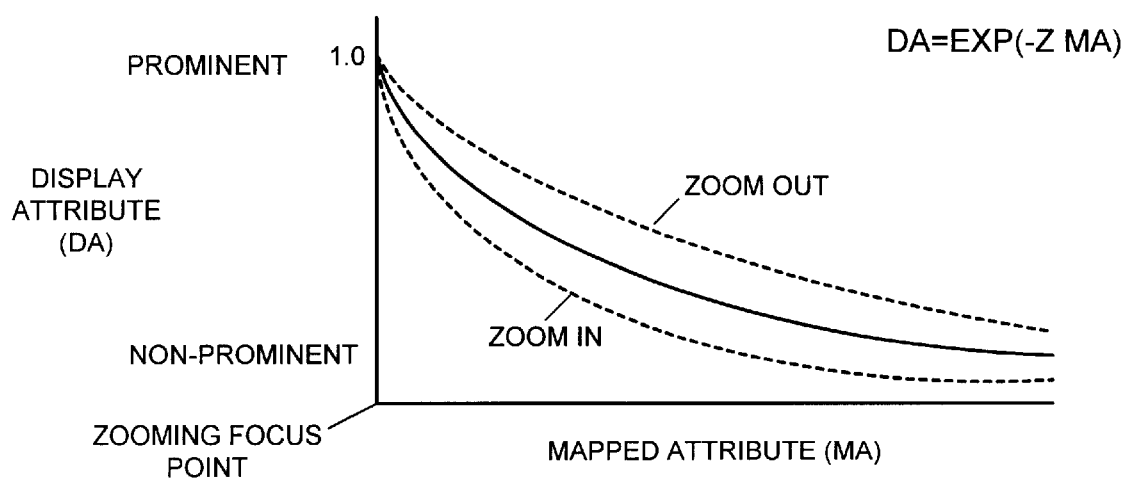
FIG. 5 illustrates another possible function for computing a display attribute in accordance with an embodiment of the present invention.

FIG. 5 illustrates another possible function for computing a display attribute in accordance with an embodiment of the present invention. This function is computed as $DA=EXP(-Z*MA)$. Note that this function increases as MA approaches zero (the zooming focus point) and decreases as MA gets larger.

If the zooming parameter Z is increased, the function falls off more rapidly as MA increases. This means a narrower range of mapped attribute values around MA=0 are mapped to prominent display attributes values. If the zooming parameter Z is decreased, the function falls off more slowly as MA increases. This means a wider range of mapped attribute values are mapped to prominent display attributes values.

Note that in this function, the zooming parameter Z works in the opposite manner as it does for the function illustrated in FIG. 4. As Z increases, the function zooms in; as Z decreases, the function zooms out.

Figure 6:
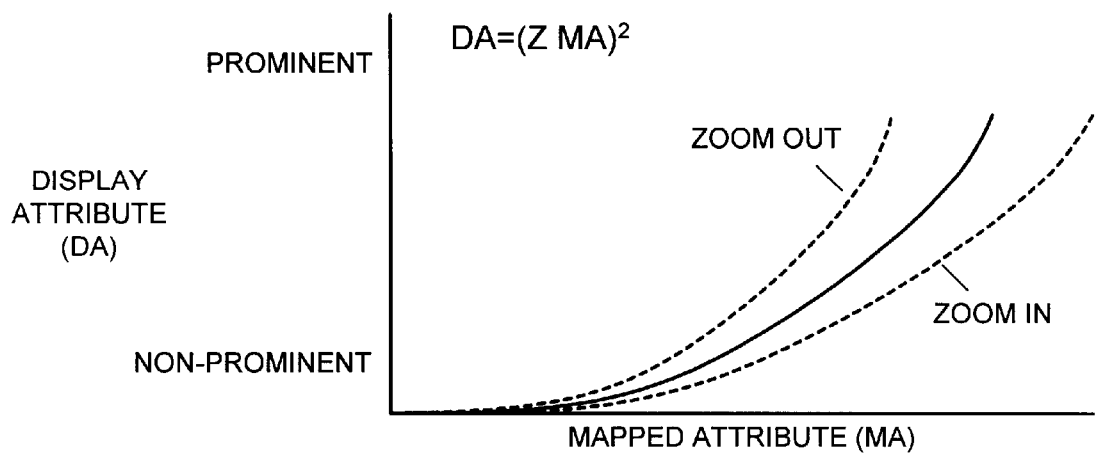
FIG. 6 illustrates yet another possible function for computing a display attribute in accordance with an embodiment of the present invention.

FIG. 6 illustrates yet another possible function for computing a display attribute in accordance with an embodiment of the present invention. This function is computed as $DA=(ZMA)^2$. Note that this function decreases as MA approaches zero, and increases as MA gets larger.

When the zooming parameter Z is increased, this function rises more rapidly as MA increases. This means a wider range of mapped attribute values around $MA_0$ are mapped to prominent display attributes values. When the zooming parameter Z is decreased, the function rises more slowly as MA increases. This means a narrower range of mapped attribute values are mapped to prominent display attributes values.

Figure 7:
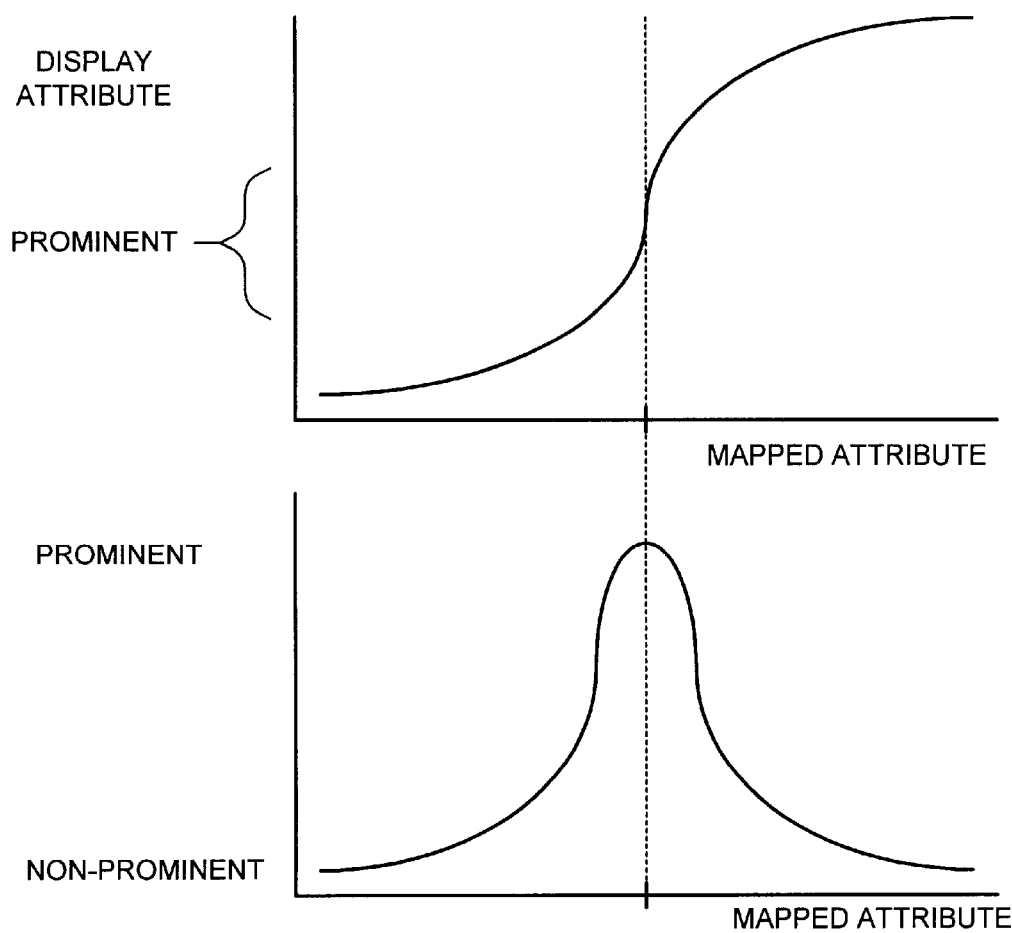
FIG. 7 illustrates a mapping of a mapped attribute to a display attribute which has a high prominence value for intermediate display attribute values in accordance with an embodiment of the present invention.

FIG. 7 illustrates a mapping of a mapped attribute to a display attribute which has a high prominence value for intermediate display attribute values in accordance with an embodiment of the present invention. Note that the preceding examples have all assumed that larger display attribute values are more prominent than smaller display attribute values. This is true for many display attributes, such as object brightness or object size.

However, other display attributes do not behave in this manner. For example, the display attribute "blink rate" is most prominent for intermediate values. When a blink rate is slow, an object attracts little attention. As the blink rate increases, the object attracts progressively more attention. However, as the blink rate increases past a certain point, a human perceives the blinking as a blur, which causes the blinking to attract less attention. Hence, the prominence of a blink rate is greatest for intermediate values.

This effect is illustrated in the upper and lower graphs in FIG. 7. The upper graph illustrates a function that causes a display attribute, such as blink rate, to increase as a mapped attribute increases. The lower graph illustrates how the corresponding prominence of the display attribute reaches a maximum value at an intermediate value of the display attribute.

Note that the above-described functions are merely exemplary. The present invention can generally be used with many different functions that map mapped attributes to display attribute values, and with many different relationships between display attribute values and prominence.

Factors that are considerations in choosing an appropriate function include the type of a function's domain (mapped attribute). For example, the domain can be bounded, half-infinite or fully infinite. The domain can also include multi-dimensional combinations of these domain types. Similarly, the type of the range (display attribute) can also vary in the same way without the multi-dimensional combinations.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for viewing a plurality of objects on a display that allows a user to zoom on a non-positional display attribute for the plurality of objects, the method comprising:

receiving a value for a mapped attribute for an object;

receiving a value for a zooming parameter for the non-positional display attribute;

mapping the mapped attribute for the object to the non-positional display attribute for the object by computing a function of the value of the mapped attribute and the value for the zooming parameter to produce a value for the non-positional display attribute;

wherein the non-positional display attribute has more than two possible values;

wherein if the value for the zooming parameter changes in a first direction, the function maps a narrower range of mapped attribute values to prominent display attribute values;

wherein if the value for the zooming parameter changes in a second direction, the function maps a wider range of mapped attribute values to prominent display attribute values; and displaying the object on the display using the non-positional display attribute.

2. The method of claim 1, wherein the value for the zooming parameter is received from the user through a data input device, so that the user can adjust the zooming parameter in order to narrow or widen a range of mapped attributes that are displayed with prominent display attribute values.

3. The method of claim 1, wherein the non-positional display attribute includes at least one of:

a fadedness of the object against a background;

a transparency of the object;

a size of the object on the display;

a color of the object;

a blink rate of the object;

a jiggle rate of the object;

a drawing order of the object relative to other objects;

a line thickness of the object;

a contrast of the object;

a spatial frequency of a pattern for the object;

a halo parameter for the object;

an animation rate for the object;

an offset of a drop shadow for the object;

a response sensitivity to user input of the object;

a binocular depth of the object; and a loudness of the object.

4. The method of claim 1, wherein the non-positional display attribute is fadedness and, wherein a display attribute value that results in the object being more faded in the display is a less prominent display attribute value, and wherein a display attribute value that results in the object being less faded in the display is a more prominent display attribute value.

5. The method of claim 1, further comprising allowing the user to scroll on the non-positional display attribute of the object by using a difference between the value of the mapped attribute for the object and a scrolling reference value received from the user in computing the function to produce non-positional display attribute for the object, so that as the user changes the scrolling reference value different ranges of mapped attribute values are mapped to prominent display attribute values.

6. The method of claim 1, wherein the steps of, receiving the value for the mapped attribute, mapping the mapped attribute, and displaying the object are repeated for the plurality of objects.

7. The method of claim 1, wherein the value of the non-positional display attribute for the object attains maximum prominence at a specific value of the mapped attribute, and wherein as the value of the mapped attribute grows larger than the specific value, the prominence of the non-positional display attribute decreases, and wherein as the value of the mapped attribute becomes smaller than the specific value, the prominence of the non-positional display attribute decreases.

8. A computer-readable storage medium storing instructions that when executed by a computer cause the computer to perform a method for viewing a plurality of objects on a display that allows a user to zoom on a non-positional display attribute for the plurality of objects, the method comprising:

receiving a value fur a mapped attribute for an object;

receiving a value for a zooming parameter for the non-positional display attribute;

mapping the mapped attribute for the object to the non-positional display attribute for the object by computing a function of the value of the mapped attribute and the value for the zooming parameter to produce a value for the non-positional display attribute;

wherein the non-positional display attribute has more than two possible values;

wherein if the value for the zooming parameter changes in a first direction, the function maps a narrower range of mapped attribute values to prominent display attribute values;

wherein if the value for the zooming parameter changes in a second direction, the function maps a wider range of mapped attribute values to prominent display attribute values; and displaying the object on the display using the non-positional display attribute.

9. The computer-readable storage medium of claim 8, wherein the value for the zooming parameter is received from the user through a data input device, so that the user can adjust the zooming parameter in order to narrow or widen a range of mapped attributes that are displayed with prominent display attribute values.

10. The computer-readable storage medium of claim 8, wherein the non-positional display attribute includes at least one of:

a fadedness of the object against a background;
a transparency of the object;
a size of the object on the display;
a color of the object;
a blink rate of the object;
a jiggle rate of the object;
a drawing order of the object relative to other objects;
a line thickness of the object;
a contrast of the object;
a spatial frequency of a pattern for the object;
a halo parameter for the object;
an animation rate for the object;
an offset of a drop shadow for the object;
a response sensitivity to user input of the object;
a binocular depth of the object; and
a loudness of the object.

11. The computer-readable storage medium of claim 8, wherein the non-positional display attribute is fadedness and, wherein a display attribute value that results in the object being more faded in the display is a less prominent display attribute value, and wherein a display attribute value that results in the object being less faded in the display is a more prominent display attribute value.

12. The computer-readable storage medium of claim 8, wherein the method further comprises allowing-the user to scroll on the non-positional display attribute of the object by using a difference between the value of the mapped attribute for the object and a scrolling reference value received from the user in computing the function to produce non-positional display attribute for the object, so that as the user changes the scrolling reference value different ranges of mapped attribute values are mapped to prominent display attribute values.

13. The computer-readable storage medium of claim 9, wherein the steps of, receiving the value for the mapped attribute, mapping the mapped attribute, and displaying the object are repeated for the plurality of objects.

14. The computer-readable storage medium of claim 8, wherein the value of the non-positional display attribute for the object attains maximum prominence at a specific value of the mapped attribute, and wherein as the value of the mapped attribute grows larger than the specific value, the prominence of the non-positional display attribute decreases, and wherein as the value of the mapped attribute becomes smaller than the specific value, the prominence of the non-positional display attribute decreases.

15. An apparatus that facilitates viewing a plurality of objects on a display that allows a user to zoom on a non-positional display attribute for the plurality of objects, the apparatus comprising:
an input receiving mechanism that is configured to receive,
a value for a mapped attribute for an object, and
a value for a zooming parameter for the non-positional display attribute;
a mapping mechanism that is configured to map the mapped attribute for the object to the non-positional display attribute for the object by computing a function of the value of the mapped attribute and the value for the zooming parameter to produce a value for the non-positional display attribute;
wherein the non-positional display attribute has more than two possible values;
wherein if the value for the zooming parameter changes in a first direction, the function maps a narrower range of mapped attribute values to prominent display attribute values;
wherein if the value for the zooming parameter changes in a second direction, the function maps a wider range of mapped attribute values to prominent display attribute values; and
a display mechanism that is configured to display the object on the display using the non-positional display attribute.

16. The apparatus of claim 15, wherein the input receiving mechanism is configured to receive the value for the zooming parameter from the user through a data input device, so that the user can adjust the zooming parameter in order to narrow or widen a range of mapped attributes that are displayed with prominent display attribute values.

17. The apparatus of claim 15, wherein the non-positional display attribute includes at least one of:
a fadedness of the object against a background;
a transparency of the object;
a size of the object on the display;
a color of the object;
a blink rate of the object;
a jiggle rate of the object;
a drawing order of the object relative to other objects;
a line thickness of the object;
a contrast of the object;
a spatial frequency of a pattern for the object;
a halo parameter for the object;
an animation rate for the object;
an offset of a drop shadow for the object;
a response sensitivity to user input of the object;
a binocular depth of the object; and
a loudness of the object.

18. The apparatus of claim 15, wherein the non-positional display attribute is fadedness and, wherein a display attribute value that results in the object being more faded in the display is a less prominent display attribute value, and wherein a display attribute value that results in the object being less faded in the display is a more prominent display attribute value.

19. The apparatus of claim 15, further comprising a scrolling mechanism that is configured to allow the user to scroll on the non-positional display attribute of the object by using a difference between the value of the mapped attribute for the object and a scrolling reference value received from the user in computing the function to produce non-positional display attribute for the object, so that as the user changes the scrolling reference value different ranges of mapped attribute values are mapped to prominent display attribute values.

20. The apparatus of claim 15, wherein the input receiving mechanism, the mapping mechanism and the display mechanism are configured to operate on the plurality of objects.

21. The apparatus of claim 15, wherein the value of the non-positional display attribute for the object attains maximum prominence at a specific value of the mapped attribute, and wherein as the value of the mapped attribute grows larger than the specific value, the prominence of the non-positional display attribute decreases, and wherein as the value of the mapped attribute becomes smaller than the specific value, the prominence of the non-positional display attribute decreases.

* * * * *